Jan. 13, 1942.　　　G. JACOBS　　　2,269,911
VEHICLE VIBRATING JACK
Filed Jan. 30, 1941　　　4 Sheets-Sheet 1
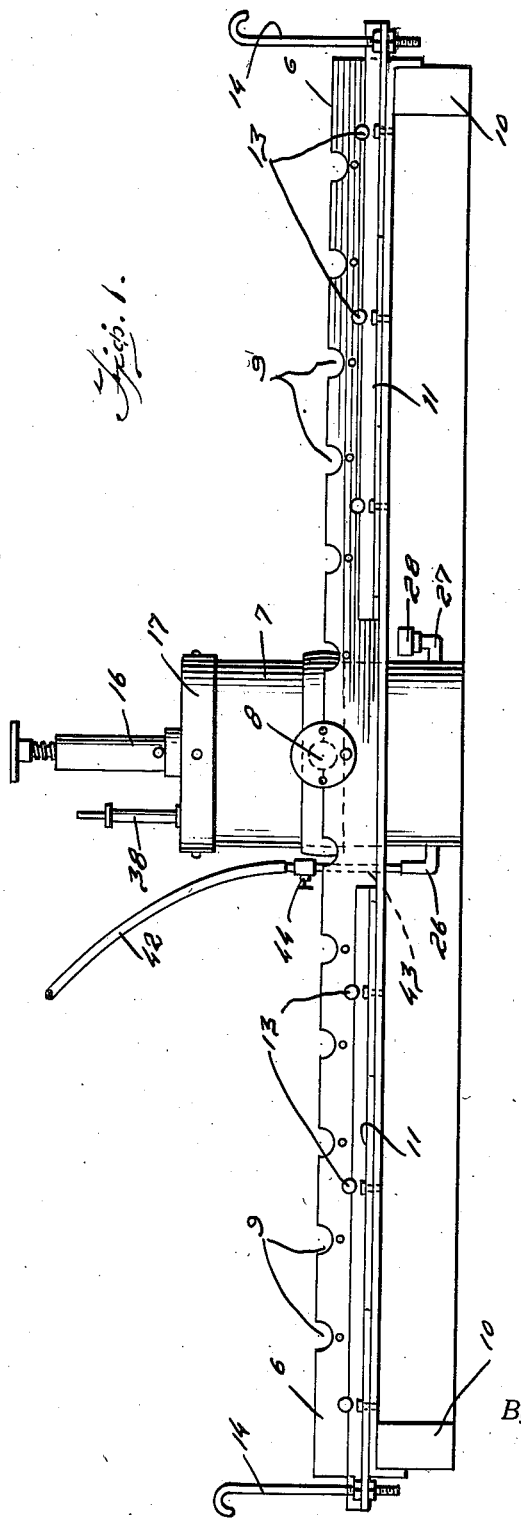
Inventor
Grant Jacobs
By Clarence A. O'Brien
Attorney

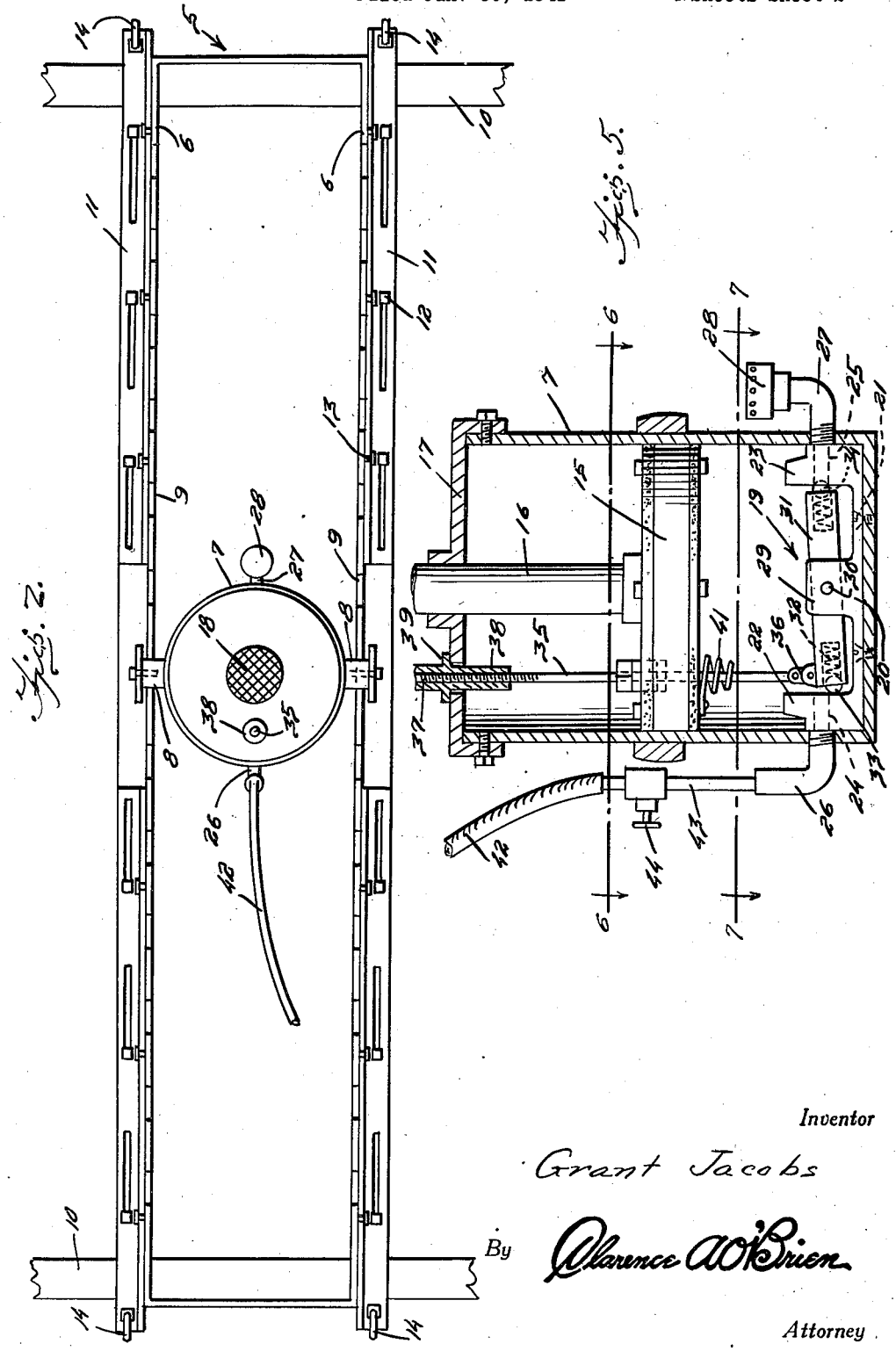

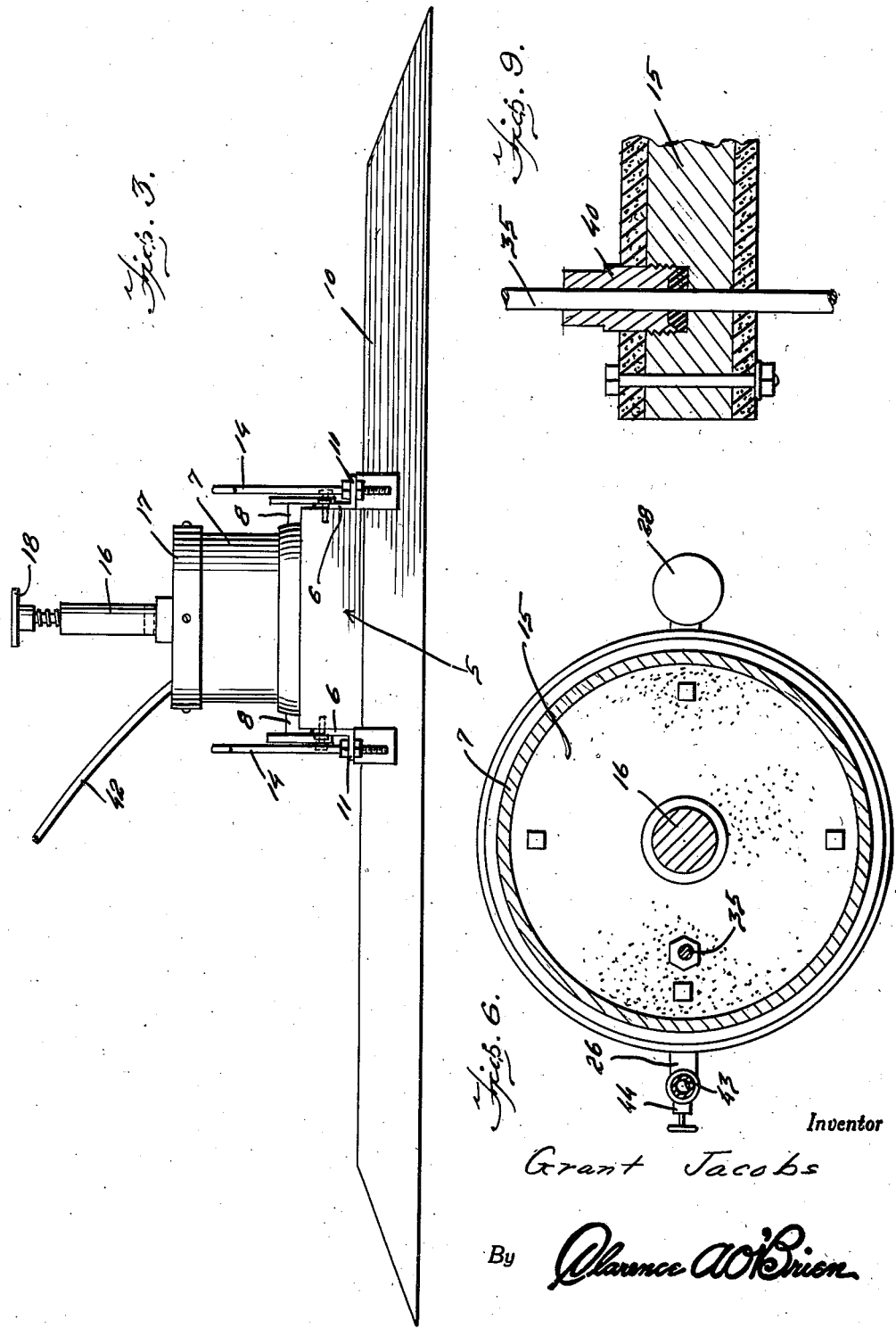

Jan. 13, 1942.　　　G. JACOBS　　　2,269,911
VEHICLE VIBRATING JACK
Filed Jan. 30, 1941　　　4 Sheets-Sheet 4
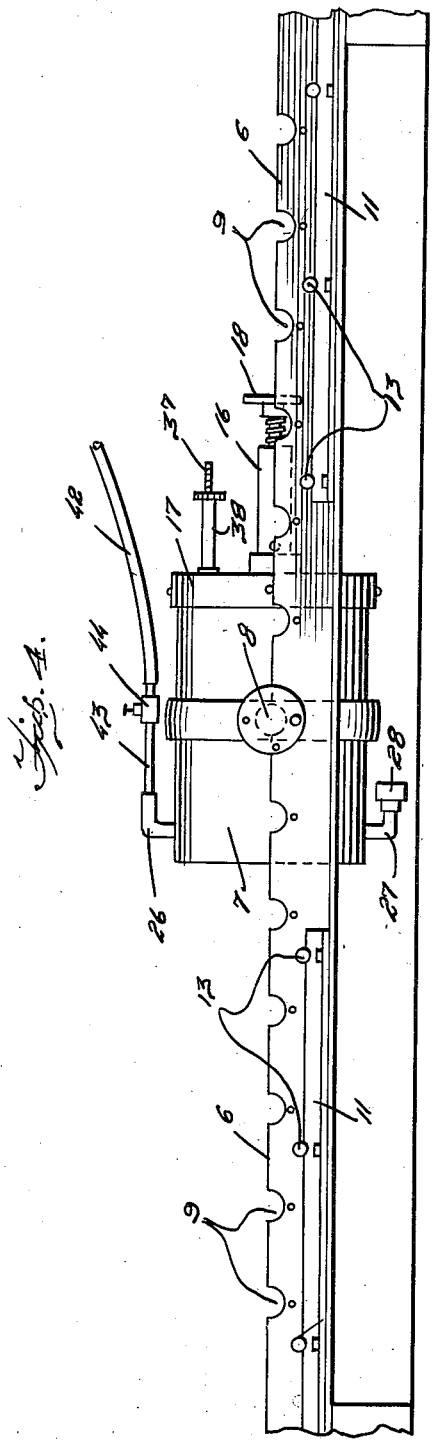
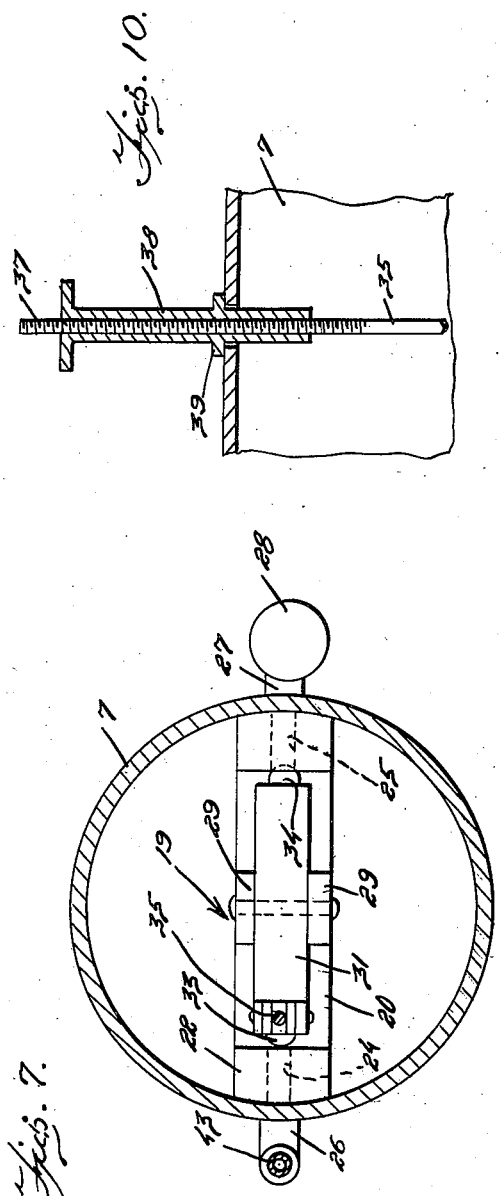
Inventor
Grant Jacobs
By Clarence A. O'Brien
Attorney Patented Jan. 13, 1942

2,269,911

UNITED STATES PATENT OFFICE 2,269,911

VEHICLE VIBRATING JACK

Grant Jacobs, Des Moines, Iowa

Application January 30, 1941, Serial No. 376,683

3 Claims. (Cl. 121—164)

This invention relates to devices used for rocking the body of vehicles, such as motor vehicles or the like, while the springs or other parts of the vehicle are being oiled or greased; and an object of the invention is to provide a device of this character which may be used to advantage in connection with oiling racks now generally employed in gasoline service stations, garages, and the like.

The invention together with its objects and advantages will be best understood from a study of the following description taken in connection with the accompanying drawings wherein:

Figure 1 is a side elevational view of a vehicle vibrating jack embodying the features of the present invention.

Figure 2 is a top plan view thereof.

Figure 3 is an end elevational view thereof.

Figure 4 is a view somewhat similar to Figure 1 but showing the jack cylinder in a substantially horizontal position.

Figure 5 is a vertical sectional view through the jack cylinder with the pistons and other parts within the cylinder shown in elevation.

Figures 6 and 7 are horizontal sectional views taken substantially on the lines 6—6 and 7—7, respectively, of Figure 5.

Figure 8 is a fragmentary vertical sectional view through the cylinder at the bottom thereof and also showing in section the valve assembly located in said bottom of the cylinder.

Figure 9 is a fragmentary detail sectional view through the piston forming part of the jack.

Figure 10 is a fragmentary detail sectional view through the top of the cylinder jack and showing a valve positioning rod, forming part of the invention.

Referring more in detail to the drawings it will be seen that in the preferred embodiment thereof the vibrating jack comprises a frame 5, the side members 6 of which serve as rails to facilitate the shifting longitudinally of the frame 5 a jack cylinder indicated generally by the reference numeral 7.

The cylinder 7 is equipped on opposite sides thereof with rollers 8 that ride on the rails 6, and the rails 6 are provided with notches 9 to accommodate the rollers 6 whereby to retain the cylinder jack at the desired position longitudinally of the frame 5 and substantially in a pivoted manner on the frame so as to be swung in a vertical plane from, for example, the position shown in Figure 1 to the position shown in Figure 4 and vice versa.

In actual practice the frame 5 is adapted to be suspended between the rails 10 of a conventional vehicle lubricating rack or hoist generally forming part of garage and service station equipment and used in oiling and lubricating springs and other parts of motor vehicles.

The rail-forming sides 6 of the frame 5 are equipped with extension members 11 at the respective opposite ends of the frame 5 to be extended longitudinally with respect to the frame when required to suspend or support the frame on the lubricating rack or hoist.

The extension members 11 are maintained in slidable contact with the base flanges of the rails 6 through the medium of bolt and slot connections 12 and are held in sliding in contact with said base flanges of the rails through the medium of guide rollers 13 provided on the rails and arranged in spaced relation longitudinally along the rails as shown.

Also where adjustment vertically of the frame 5 is desired, resort may be had to suspension hooks 14 provided at the outer ends of the slide extensions 11. Obviously through the medium of the hooks 14 the frame 5 and associated parts may be suspended from the rails 10 of the lubricating rack or hoist by engaging the hooks with said rails 10.

A piston 15 has a working fit in the jack cylinder 7 and is provided on the inner end of a jack rod 16 that works through a removable cap 17 provided for the cylinder 7. On the outer or free end thereof the jack rod 16 is equipped with a work-engaging head 18 as shown.

Arranged within the cylinder 7 at the bottom thereof is a valve assembly indicated generally by the reference numeral 19.

The assembly 19 embodies a plate 20 secured in position and to the bottom of the cylinder 7 through the medium of screws or other fastening elements 21. At the relatively opposite ends thereof the member 20 is provided with upstanding formations 22, 23 provided respectively with bores or air passages 24, 25; the bore 24 serving as an inlet for the cylinder 7 and the bore 25 serving as an outlet for said cylinder; bore 24 being in alignment with an air inlet elbow 26 that has one end thereof tapped into the cylinder and bore 25 being in alignment with an exhaust elbow 27 that has one end thereof tapped into the wall of the cylinder 7 and the free end thereof equipped with a perforated cap 28 as best shown in Figure 5.

The plate 20 is provided intermediate the ends thereof with opposed spaced lugs 29 between which is pivoted, as at 30, a rocker arm 31.

The rocker arm 31 is provided in one end thereof with an axial socket housing a spring 32 that serves to normally urge outwardly with respect to said socket a ball valve element 33, the exposed periphery of which rides against one vertical face of the formation 22 and acts as a check valve for the port 24. At the opposite end thereof the rocker arm 31 is similarly equipped with a ball check valve 34 for the port 25.

The stroke of the rocker arm 31 may be adjusted as found desirable through the medium of an adjusting rod 35 therefor. The rod 35 is pivoted at one end thereof to one end of the rocker arm 31, as indicated generally at 36, and extends through an opening provided therefor in the cap 17. The upper portion of the rod 35 is threaded as at 37 and threaded on said section of the rod 35 is a sleeve 38 that is provided with a collar 39 as shown and which acts as an abutment to strike the crown of the cap 17 for limiting downward movement of the rod 35. Thus it will be seen that by adjusting the sleeve 38 on the threaded section 37 of rod 35 the stroke of the rod, and consequently of the rocker arm 31, may be adjusted as found desirable.

The rod 35 extends through an opening provided therefor in the piston 15 and to accommodate the rod 35, and at the same time prevent the escape of air through the bore in the piston 15 accommodating the rod 35, said piston 15 is equipped with a gland structure 40 as best shown in Figure 9.

Also suitably anchored to the underside of the piston 15 is a coil spring 41 which, as will be hereinafter more fully explained, serves to transmit downward movement of the piston 15 to the rocker arm 31 for rocking the arm 31 in a counter-clockwise direction, as and for a purpose hereinafter more fully explained.

A flexible hose or conduit 42, leading from a suitable source of compressed air supply, is connected at one end with the elbow 26 through the medium of a riser pipe 43 in which is interposed a manually manipulative cut-off valve 44.

It will thus be seen that in using the jack for rocking or vibrating the body of a motor vehicle while the springs, spring shackles, and other parts of the vehicle are being greased or oiled in order that the grease will properly penetrate the desired parts, and to enable the operator to determine and eliminate squeaks in the vehicle, the jack cylinder 7 is first moved to bring the work-engaging head 18 in proper position relative to the parts of the vehicle to be engaged thereby. When this is done, valve 44 is opened so that air under pressure will pass through the elbow 26 and the passage 24 into the cylinder 7 beneath the piston 15; the rocker arm 31 being in the position shown in Figure 5.

In response to the pressure being built up in back of the piston 15 the latter will move upwardly until the gland nut of the gland assembly 40 engages the lower or inner end of the sleeve 38 whereupon rod 35 will then move with the piston 15 causing the rocker arm 31 to swing in a clockwise direction for bringing the valve 33 into closing position opposite the port 24 and moving the valve 34 into lowered position opening the port 25. When the supply of air to the cylinder 7 is cut off in this manner and the air in the cylinder is permitted to exhaust, the weight of the vehicle on the rod 16 will cause the piston 15 to move downwardly and as the piston reaches the limit of its downward stroke, spring 41 will impinge against the valve-equipped end 32 of rocker arm 31 causing the latter then to rotate in a counter-clockwise direction for opening the port 24 and closing the port 25 with the result that air under pressure will again enter the cylinder 7 for raising the piston 15. Thus, by this rocking movement being constantly imparted to the rocker arm 31 for alternately opening and closing the ports 24 and 25, the piston 15 is caused constantly to move up and down thus resulting in a rocking movement or vibration being imparted to the body of the vehicle as and for the purpose herein stated.

Obviously, by adjusting the sleeve 38 on the rod 35, the oscillatory movement of the piston 15 just described may be increased or decreased in tempo as found desirable.

It is thought that the simplicity of the device together with its many advantages and adaptability for the purpose designed will all be apparent to those skilled in the art without further detailed description thereof.

It is also to be understood that while I have herein illustrated and described the preferred embodiment of the invention, I claim all such forms of the invention to which I am entitled and as come within the scope of the appended claims.

Having thus described the invention what is claimed as new is:

1. In a device of the character described, a jack embodying a cylinder, a piston movable in the cylinder, means within the cylinder for controlling the admission and exhaust of fluid below the piston, and said means embodying a valve assembly having a fluid intake port and a fluid exhaust port, a rocker arm pivotally mounted between said ports and equipped at one end with a spring-pressed valve controlling the intake port, and at a relatively opposite end with a spring-pressed valve controlling the exhaust port, and an operating connection between said piston and said rocker arm for transmitting movement of the piston to the rocker arm for controlling the intake and exhaust of the fluid.

2. In a device of the character described, a jack embodying a cylinder, a piston movable in the cylinder, means within the cylinder for controlling the admission and exhaust of fluid below the piston, and said means embodying a valve assembly having a fluid intake port and a fluid exhaust port, a rocker arm pivotally mounted between said ports and equipped at one end with a spring-pressed valve controlling the intake port, and at a relatively opposite end with a spring-pressed valve controlling the exhaust port, a rod extending through said piston and one end of said cylinder, and pivotally connected at one end to one end of said rocker arm, interengaging means on said rod and piston operable upon engagement to transmit movement of the piston in one direction to said rod, and means carried by the piston and engageable with said rocker arm upon reverse movement of the piston to rock said arm in a reverse direction.

3. In a device of the character described, a jack embodying a cylinder, a piston movable in the cylinder, means within the cylinder for controlling the admission and exhaust of fluid below the piston, and said means embodying a valve assembly having a fluid intake port and a fluid exhaust port, a rocker arm pivotally mounted between said ports and equipped at one end with a spring-pressed valve controlling the intake port, and at a relatively opposite end with a spring-pressed valve controlling the exhaust port, a rod extending through said piston and one end of said cylinder, and pivotally connected at one end to one end of said rocker arm, interengaging means on said rod and piston operable upon engagement to transmit movement of the piston in one direction to said rod, and a coil spring on the underside of said piston to contact an end of said rocker arm upon movement of the piston in a reverse direction to shift the position of said rocker arm.

GRANT JACOBS.